June 7, 1938.  J. D. CUNNINGHAM  2,119,950
RECORDING INSTRUMENT
Original Filed Jan. 6, 1936
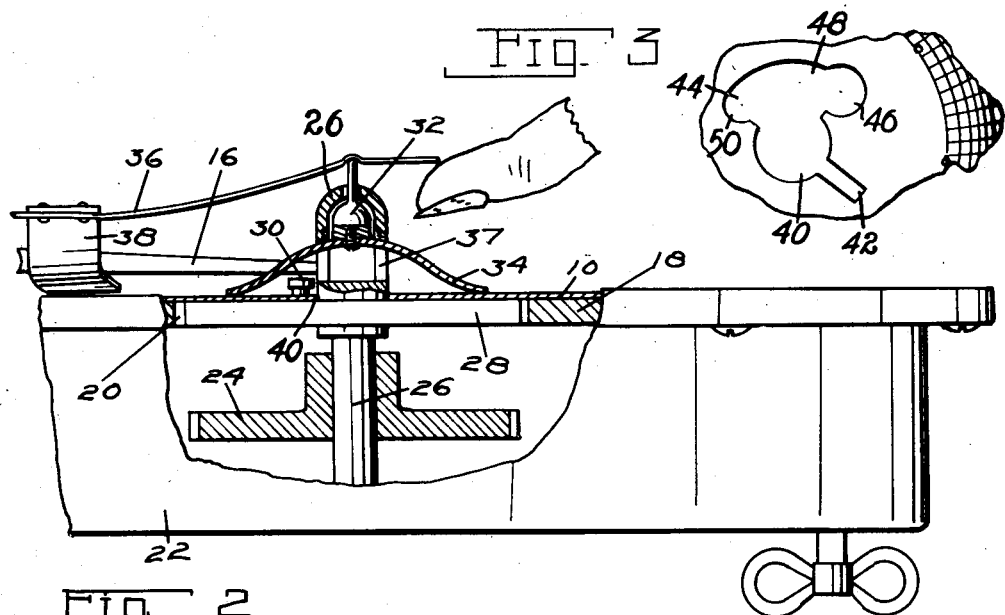
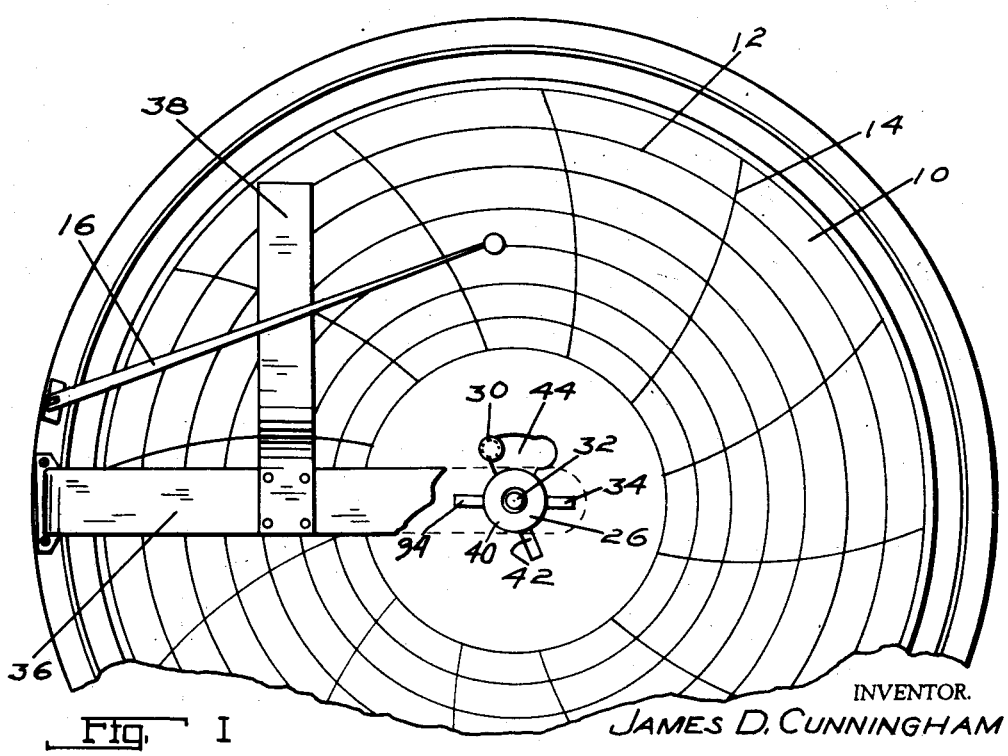
INVENTOR.
JAMES D. CUNNINGHAM
BY McConkey & Booth
ATTORNEYS.

Patented June 7, 1938

2,119,950

UNITED STATES PATENT OFFICE 2,119,950

RECORDING INSTRUMENT

James D. Cunningham, Chicago, Ill., assignor to Republic Flow Meters Company, Chicago, Ill., a corporation of Illinois Original application January 6, 1936, Serial No. 57,657. Divided and this application May 4, 1936, Serial No. 77,683

3 Claims. (Cl. 234—72)

This invention relates to recording instruments, and is illustrated as embodied in a recorder in which a pen automatically draws a curve on a rotating chart.

In a very desirable arrangement the chart is yieldingly held in place by means including a member which is arranged when lifted to lift the pen out of the way and at the same time to release the chart.

In one embodiment, this pen lifter (when released) depresses a plunger in the driving post, which plunger is provided with members (such as the ends of a bowed leaf spring) which clamp the chart yieldingly in place.

The above and other objects and features of the invention, including various novel combinations of parts and desirable particular constructions, will be apparent from the following description of the illustrative embodiments shown in the accompanying drawing, in which:

Figure 1 is a top plan view, partly broken away, of an instrument embodying one form of my invention;

Figure 2 is a section generally centrally through the instrument; and

Figure 3 is a partial plan view of the chart used with the instrument.

The chart used with the instrument of Figures 1 and 2, and which is shown in Figure 3, comprises a disk 10 of paper or the like, printed with indicia shown as including a series of concentric circles 12 graduated in terms of temperature, pressure, flow, or other condition to be recorded.

The chart also has printed thereon a series of angularly spaced arcuate time lines 14 representing hours, days, or other time intervals. When the chart is positioned in the instrument, the time lines 14 coincide with the arc of a circle struck by a recording pen 16 (Figure 1) pivoted to swing about a center outside the periphery of the chart, when the chart is in different angular positions corresponding to the times according to which lines 14 are graduated. Preferably the arcs of time lines 14, if extended, would all intersect the common center of the circles 12.

The pen 16 is swung angularly toward and from the center of the chart under the control of means measuring the condition to be recorded, in various ways well known in the recorder art.

The pen 16 is pivoted adjacent the edge of a suitable panel 18, formed with an opening 20, back of which is secured a suitable clock mechanism 22, the last gear 24 of which is shown as adjustably frictionally carrying a cylindrical chart-driving post 26 provided with a chart-supporting part such as a flange 28 having its face in the same plane as the face of the panel 18.

Offset from the center of rotation of the post 26, the flange 28 is provided with a timing projection such as an upstanding headed pin 30.

The upper end of the post 26 is formed as a hollow guide for a central plunger 32 carrying chart-clamping means such as a bowed leaf spring 34 projecting radially outward through slots 37.

When the chart is in position, the plunger 32 is depressed, to actuate member 34 to hold the chart against flange 28, by means preferably including a spring steel pen lifter 36 secured to the edge of the panel 18 and strong enough to overcome the spring arms 34 and hold the chart.

This spring device 36 has secured thereto a leaf-spring extension 38 which is arranged beneath the pen 16, so that when the device 36 is lifted to release the chart, as shown in Figure 2, it automatically lifts the pen out of the way. When the record is being made, the arm 38 holds the chart against the panel immediately adjacent the pen 16.

The chart 10 has a central opening 40, to fit over the post 26 and the center of which is the same as the common center of the circles 12, so that these circles are automatically centered relatively to the axis of rotation of the post 26. It also has extensions or slots 42 and 44 from the opening 40 which pass over the spring arms 34 in inserting and removing the chart.

The chart also has an opening 46 large enough to pass over the head of the timing projection 30, and which continues as an arcuate portion 48 through which the shank of that projection passes when the chart, after insertion in the instrument, is turned to bring the spring arms 34 out of registry with the slots 42 and 44, and at the same time to set the chart in its predetermined timed position with the shank of projection 30 engaging a timing edge 50 which has a predetermined angular position relatively to the time lines 14.

As a convenience in manufacturing the charts, the openings 40—42—44—46—48 may all be merged in a composite opening of irregular outline, as shown in Figure 3.

While various illustrative constructions have been described in detail, it is not my intention to limit the scope of the invention by that description, or otherwise than by the terms of the appended claims.

The above-described chart and its holding means are claimed in my application No. 57,657, filed January 6, 1936, now matured into Patent No. 2,073,143 issued March 9, 1937, of which the present application is a division.

I claim:

1. An instrument having a chart-driving central post provided with chart-holding means, a pen for making a record on said chart, and a lifter for said pen constructed and arranged to move said chart holding means into clamping engagement with a chart.

2. An instrument having a chart-driving central post provided with a yieldingly retracted central plunger and chart-holding means secured to said plunger, a pen for making a record on said chart, and a lifter for said pen operative yieldingly to force said plunger axially of the post to press the chart-holding means into clamping engagement with a chart.

3. An instrument having a chart-driving post, a plunger centrally mounted in said post and provided with yielding chart-holding spring members projecting radially from the post, a pen arranged to make a record on the chart, and a lifter for the pen normally yieldingly forcing said plunger into the post to tension said members to hold the chart.

JAMES D. CUNNINGHAM.